US008991433B2

(12) United States Patent
Baseley

(10) Patent No.: US 8,991,433 B2
(45) Date of Patent: Mar. 31, 2015

(54) ENERGY STORAGE SYSTEM INCLUDING AN EXPANDABLE ACCUMULATOR AND RESERVOIR ASSEMBLY

(75) Inventor: Simon J. Baseley, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 1059 days.

(21) Appl. No.: 12/897,442

(22) Filed: Oct. 4, 2010

(65) Prior Publication Data

US 2011/0079140 A1 Apr. 7, 2011

Related U.S. Application Data

(60) Provisional application No. 61/369,214, filed on Jul. 30, 2010, provisional application No. 61/248,573, filed on Oct. 5, 2009.

(51) Int. Cl.
*F16L 55/04* (2006.01)
*F15B 1/26* (2006.01)

(52) U.S. Cl.
CPC ........ *F15B 1/26* (2013.01)
USPC ........ 138/30

(58) Field of Classification Search
CPC ........ F16L 55/043; F16L 55/045; F16L 55/05
USPC ........ 138/30
See application file for complete search history.

(56) References Cited

U.S. PATENT DOCUMENTS

| | | | | |
|---|---|---|---|---|
| 224,370 | A | 2/1880 | Wilson | |
| 435,927 | A | 9/1890 | Ginty | |
| 2,497,491 | A | 2/1950 | Douglas | |
| 2,642,091 | A | 6/1953 | Morin | |
| 2,760,518 | A | 8/1956 | Peet | |
| 3,091,258 | A | 5/1963 | Marette | |
| 3,162,213 | A | 12/1964 | Peters | |
| 3,163,985 | A | 1/1965 | Bouyoucos | |
| 3,276,477 | A | 10/1966 | Bleasdale | |
| 3,348,578 | A * | 10/1967 | Mercier | 138/30 |
| 3,442,292 | A | 5/1969 | Jacuzzi | |
| 3,461,914 | A | 8/1969 | Sugimura et al. | |

(Continued)

FOREIGN PATENT DOCUMENTS

| | | |
|---|---|---|
| CN | 1451080 | 10/2003 |
| CN | 1650108 | 8/2005 |

(Continued)

OTHER PUBLICATIONS

Australian Patent Office Action for Application No. 2010303729 dated Nov. 13, 2013 (5 pages).

(Continued)

*Primary Examiner* — James Hook
(74) *Attorney, Agent, or Firm* — Michael Best & Friedrich LLP

(57) ABSTRACT

An expandable accumulator and reservoir assembly includes a reservoir defining an interior chamber containing working fluid therein and an expandable accumulator. The expandable accumulator includes an inner layer and an outer layer at least partially surrounding the inner layer. The inner layer includes a higher fracture strain than the outer layer. The accumulator is at least partially positioned in the reservoir and at least partially immersed in the working fluid contained within the interior chamber. The accumulator is configured to exchange working fluid with the reservoir.

26 Claims, 12 Drawing Sheets

(56) References Cited

U.S. PATENT DOCUMENTS

| | | | | |
|---|---|---|---|---|
| 3,473,565 | A * | 10/1969 | Blendermann | 137/593 |
| 3,481,254 | A | 12/1969 | Wetherbee, Jr. | |
| 3,493,001 | A | 2/1970 | Bevandich | |
| 3,625,242 | A | 12/1971 | Ostwald | |
| 3,665,967 | A | 5/1972 | Kachnik | |
| 3,788,358 | A | 1/1974 | Taki | |
| 3,847,182 | A | 11/1974 | Greer | |
| 3,893,485 | A * | 7/1975 | Loukonen | 138/30 |
| 3,907,000 | A | 9/1975 | Carr | |
| 3,951,143 | A | 4/1976 | Kitrilakis et al. | |
| 3,993,069 | A | 11/1976 | Buckles et al. | |
| 4,032,265 | A * | 6/1977 | Miller | 417/540 |
| 4,091,393 | A | 5/1978 | Masuyama et al. | |
| 4,162,692 | A | 7/1979 | Greer et al. | |
| 4,273,160 | A | 6/1981 | Lowles | |
| 4,351,409 | A | 9/1982 | Malik | |
| 4,367,786 | A | 1/1983 | Hafner et al. | |
| 4,386,601 | A | 6/1983 | Trick | |
| 4,417,567 | A | 11/1983 | Trick | |
| 4,432,393 | A | 2/1984 | Mills | |
| 4,497,388 | A * | 2/1985 | Dexter | 181/233 |
| 4,514,151 | A * | 4/1985 | Anders et al. | 417/540 |
| 4,520,840 | A | 6/1985 | Michel | |
| 4,651,781 | A | 3/1987 | Kandelman | |
| 4,751,869 | A | 6/1988 | Paynter | |
| 4,872,486 | A * | 10/1989 | Sugimura et al. | 138/30 |
| 5,067,390 | A | 11/1991 | Negishi | |
| 5,246,761 | A | 9/1993 | Sasaki | |
| 5,380,074 | A | 1/1995 | Jones | |
| 5,618,629 | A * | 4/1997 | Takamatsu et al. | 428/475.5 |
| 5,709,248 | A * | 1/1998 | Goloff | 138/30 |
| 5,937,732 | A | 8/1999 | Homann | |
| 6,076,557 | A | 6/2000 | Carney | |
| 6,146,114 | A | 11/2000 | Nardacci et al. | |
| 6,164,336 | A * | 12/2000 | Pasquet et al. | 138/30 |
| 6,247,763 | B1 | 6/2001 | Rehn et al. | |
| 6,389,868 | B2 | 5/2002 | Nagao et al. | |
| 6,460,571 | B1 | 10/2002 | Rajabi et al. | |
| 6,651,698 | B1 * | 11/2003 | Wilkes | 138/30 |
| 6,666,127 | B2 | 12/2003 | Peles | |
| 6,868,773 | B2 | 3/2005 | Davis et al. | |
| 6,948,479 | B1 | 9/2005 | Raney et al. | |
| 7,048,009 | B2 | 5/2006 | Verhaeghe | |
| 7,107,767 | B2 | 9/2006 | Frazer et al. | |
| 7,306,006 | B1 | 12/2007 | Cornell | |
| 7,526,918 | B2 | 5/2009 | Hall et al. | |
| 7,540,958 | B2 | 6/2009 | Chevallet et al. | |
| 7,600,376 | B2 | 10/2009 | Hall et al. | |
| 7,677,036 | B2 | 3/2010 | Hall et al. | |
| 7,762,364 | B2 | 7/2010 | Hall et al. | |
| 8,701,398 | B2 * | 4/2014 | Baseley et al. | 60/414 |
| 2003/0000588 | A1 | 1/2003 | Kuykendal et al. | |
| 2004/0144437 | A1 | 7/2004 | Kaltsounis et al. | |
| 2005/0020870 | A1 | 1/2005 | Suzuki et al. | |
| 2007/0025890 | A1 | 2/2007 | Joshi et al. | |
| 2007/0077463 | A1 | 4/2007 | Adams et al. | |
| 2007/0131295 | A1 * | 6/2007 | Rose | 138/30 |
| 2008/0023493 | A1 | 1/2008 | Lavan | |
| 2008/0201932 | A1 | 8/2008 | Schlag | |
| 2008/0308168 | A1 | 12/2008 | O'Brien, II et al. | |
| 2009/0007980 | A1 | 1/2009 | Hall et al. | |
| 2009/0008171 | A1 | 1/2009 | Hall et al. | |
| 2009/0008918 | A1 | 1/2009 | Hall et al. | |
| 2009/0205731 | A1 * | 8/2009 | Weber | 138/31 |
| 2012/0211112 | A1 | 8/2012 | Barth et al. | |

FOREIGN PATENT DOCUMENTS

| | | |
|---|---|---|
| DE | 2351267 | 4/1975 |
| DE | 2551580 | 5/1977 |
| DE | 3941904 | 6/1991 |
| EP | 0197911 | 10/1986 |
| JP | 62196401 | 8/1987 |
| JP | 5229076 | 9/1993 |
| JP | H07-508821 | 9/1995 |
| WO | 2008013685 | 1/2008 |
| WO | 2011/044042 | 4/2011 |

OTHER PUBLICATIONS

Li, Perry, Research to Increase Fluid Power Energy Storage Density, newsletter, Aug. 2009, p. 7, Center for Compact and Efficient Fluid Power.

Vanderbilt University, High Energy-Density Hydraulic Accumulator, brochure, Sep. 21, 2009, 1 page, Vanderbilt University Office of Technology Transfer and Enterprise Development.

Australian Patent Office Action for Application No. 2010303729 dated Sep. 20, 2013 (3 pages).

International Search Report and Written Opinion in corresponding PCT/US2010/051323 dated Dec. 29, 2010, 12 pages.

United States Patent Office Action for U.S. Appl. No. 13/424,585 dated Oct. 8, 2013 (9 pages).

Mexican Patent Office Action for Application No. MX/a/2012/004066 dated Jun. 9, 2014 (5 pages).

Chinese Office Action for Application No. 201080050409.4 dated Mar. 5, 2014 (Original and English Translation, 27 pages).

Japanese Patent Office Action for Application No. 2012-532387 dated Aug. 11, 2014 (2 pages—with English Abstract).

Chinese Patent Office Action for Application No. 201080050409.4 dated Nov. 4, 2014 (2 pages—with English Abstract).

* cited by examiner

ENERGY STORAGE SYSTEM INCLUDING AN EXPANDABLE ACCUMULATOR AND RESERVOIR ASSEMBLY

CROSS-REFERENCE TO RELATED APPLICATIONS

This application claims priority to co-pending U.S. Provisional Patent Application No. 61/369,214 filed on Jul. 30, 2010, and co-pending U.S. Provisional Patent Application No. 61/248,573 filed on Oct. 5, 2009, the entire contents of both of which are incorporated herein by reference.

FIELD OF THE INVENTION

The present invention relates to hybrid drive systems for vehicles, and more particularly to hybrid hydraulic drive systems for vehicles.

BACKGROUND OF THE INVENTION

A typical vehicle hybrid hydraulic drive system uses a reversible pump/motor to absorb power from and add power to or assist a conventional vehicle drive system. The system absorbs power by pumping hydraulic fluid from a low pressure reservoir into a hydraulic energy storage system. This hydraulic energy storage system typically includes one or more nitrogen-charged hydraulic accumulators. Hybrid hydraulic drive systems typically add power to conventional vehicle drive systems by utilizing the hydraulic energy stored in the hydraulic accumulators to drive the reversible pump/motor as a motor.

SUMMARY OF THE INVENTION

The present invention provides, in one aspect, an expandable accumulator and reservoir assembly including a reservoir defining an interior chamber containing working fluid therein, and an expandable accumulator at least partially positioned in the reservoir and at least partially immersed in the working fluid contained within the interior chamber. The accumulator is configured to exchange working fluid with the reservoir.

The present invention provides, in another aspect, an energy storage system including a reservoir defining an interior chamber containing working fluid therein, a reversible pump/motor in fluid communication with the reservoir, and an expandable accumulator at least partially positioned in the reservoir and at least partially immersed in the working fluid contained within the interior chamber. The accumulator contains working fluid, and is in selective fluid communication with the reversible pump/motor to deliver pressurized working fluid to the reversible pump/motor when operating as a motor, and to receive pressurized working fluid discharged by the reversible pump/motor when operating as a pump.

The present invention provides, in yet another aspect, a method of operating an energy storage system. The method includes providing a reservoir defining an interior chamber containing working fluid therein, positioning an expandable accumulator at least partially within the interior chamber, immersing the expandable accumulator at least partially into the working fluid contained within the interior chamber, returning working fluid to the reservoir with a reversible pump/motor when operating as a motor, and drawing working fluid from the reservoir when the reversible pump/motor is operating as a pump.

The present invention provides, in another aspect, an expandable accumulator including a body having an inner layer defining an interior space and an outer layer at least partially surrounding the inner layer. The accumulator also includes an inlet/outlet port in fluid communication with the interior space. The inner layer includes a higher fracture strain than the outer layer.

The present invention provides, in yet another aspect, an expandable accumulator and reservoir assembly including a reservoir defining an interior chamber containing working fluid therein and an expandable accumulator. The expandable accumulator includes an inner layer and an outer layer at least partially surrounding the inner layer. The inner layer includes a higher fracture strain than the outer layer. The accumulator is at least partially positioned in the reservoir and at least partially immersed in the working fluid contained within the interior chamber. The accumulator is configured to exchange working fluid with the reservoir.

The present invention provides, in another aspect, an expandable accumulator and reservoir assembly including a reservoir defining a central axis and an interior chamber containing working fluid therein, and an expandable accumulator coaxial with the central axis, at least partially positioned in the reservoir, and at least partially immersed in the working fluid contained within the interior chamber. The accumulator is configured to exchange working fluid with the reservoir. The assembly also includes a support coaxial with the reservoir and extending for at least the length of the accumulator. The support is engageable with an outer periphery of the accumulator to limit expansion of the accumulator upon receipt of pressurized working fluid from the reservoir.

The present invention provides, in yet another aspect, an expandable accumulator and reservoir assembly including a reservoir defining an interior chamber containing working fluid therein and a single expandable accumulator at least partially positioned in the reservoir and at least partially immersed in the working fluid contained within the interior chamber. The accumulator is configured to exchange working fluid with the reservoir. The reservoir includes an internal volume, and the accumulator occupies between about 40% and about 70% of the internal volume of the reservoir depending upon the amount of working fluid in the accumulator.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
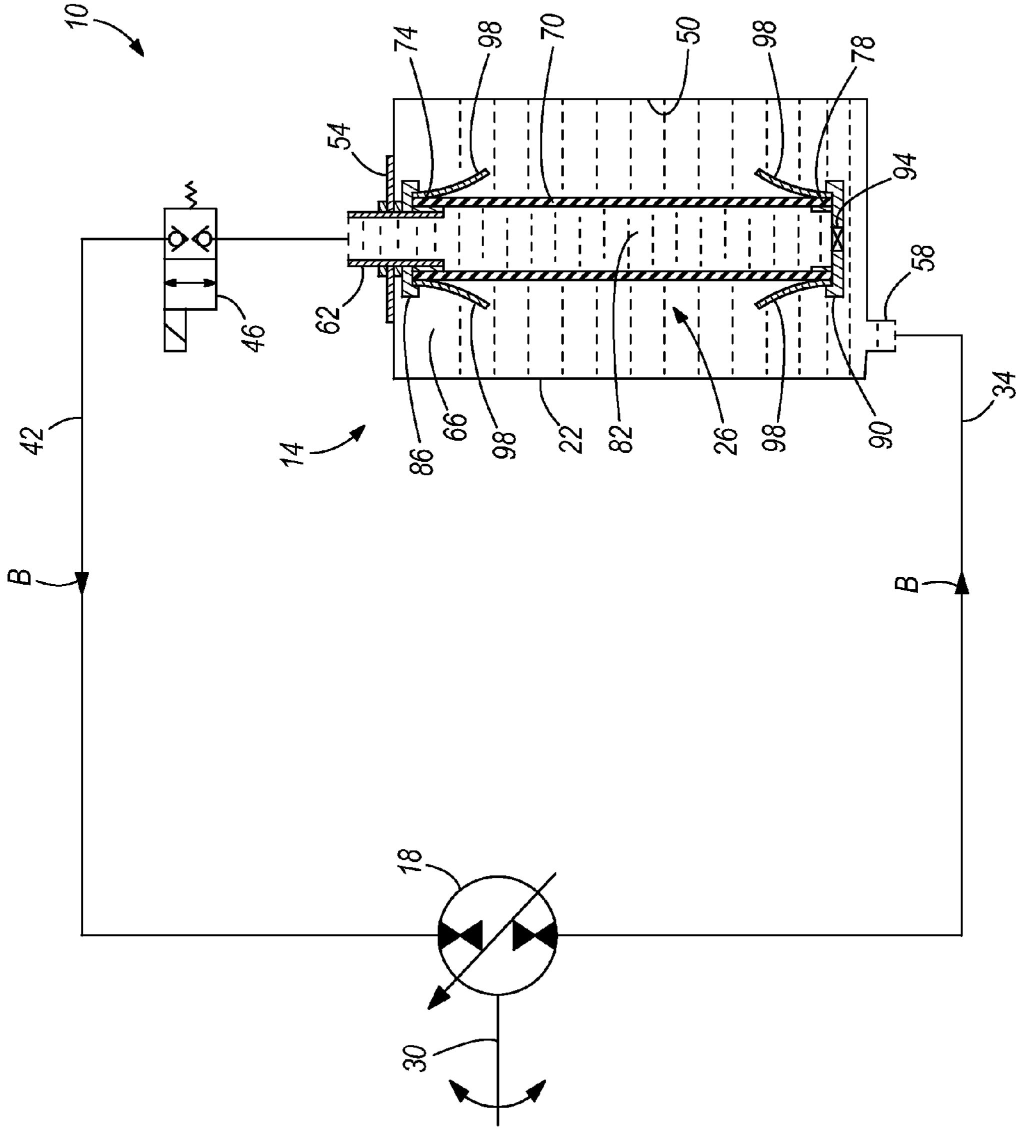
FIG. 1 is a schematic of a first construction of an energy storage system of the present invention, illustrating a reservoir and an expandable accumulator positioned within the reservoir.

FIG. 1 illustrates an energy storage system 10 for a hybrid vehicle. However, the system 10 may be utilized in other applications (e.g., a mobile or industrial hydraulic application, etc.). Specifically, the system 10 is configured as a parallel hydraulic regenerative drive system 10 including an accumulator and reservoir assembly 14 and a reversible pump/motor 18 operably coupled to the assembly 14. Alternatively, the system 10 may be configured as a series hydraulic regenerative drive system, in which the pump/motor 18 is directly coupled to a wheel or drive axle of a vehicle. As a further alternative, the system 10 may include more than one pump/motor 18.

The assembly 14 includes a reservoir 22 and an accumulator 26 in selective fluid communication with the reservoir 22 via the pump/motor 18. The reversible pump/motor 18 is configured as a variable displacement, axial-piston, swashplate-design pump/motor 18, such as a Bosch Rexroth Model No. A4VSO variable displacement, axial piston reversible pump/motor 18. Alternatively, the reversible pump/motor 18 may be configured having a constant displacement rather than a variable displacement. The reversible pump/motor 18 is drivably coupled to a rotating shaft 30 (e.g., an output shaft of an engine, an accessory drive system of the engine, a drive shaft between a transmission and an axle assembly, a wheel or drive axle, etc.). As is described in more detail below, the pump/motor 18 transfers power to the rotating shaft 30 when operating as a motor, and the pump/motor 18 is driven by the rotating shaft 30 when operating as a pump.

With continued reference to FIG. 1, the reservoir 22 contains working fluid (e.g., hydraulic fluid) and is in fluid communication with the reversible pump/motor 18 by a fluid passageway 34. A heat exchanger and/or a working fluid filter (not shown) may be situated in the fluid passageway 34 to facilitate cooling and filtering of the working fluid. The reversible pump/motor 18 is in fluid communication with the reservoir 22 to draw low-pressure working fluid (in the direction of arrow A in FIG. 2) from the reservoir 22 via the fluid passageway 34 when operating as a pump. The reversible pump/motor 18 is also in fluid communication with the reservoir 22 to return low-pressure working fluid (in the direction of arrow B in FIG. 1) to the reservoir 22 via the fluid passageway 34 when operating as a motor.

The reversible pump/motor 18 is in fluid communication with the accumulator 26 via a fluid passageway 42 to deliver pressurized working fluid (in the direction of arrow A in FIG. 2) to the accumulator 26 when operating as a pump. The reversible pump/motor 18 is also in fluid communication with the accumulator 26 via the fluid passageway 42 to receive pressurized working fluid (in the direction of arrow B in FIG. 1) from the accumulator 26 when operating as a motor. An isolation valve 46 is situated in the fluid passageway 42 and blocks the flow of working fluid through the passageway 42 when in a closed configuration, and permits the flow of working fluid through the passageway 42 when in an open configuration.

With continued reference to FIG. 1, the reservoir 22 defines an interior chamber 50 in which the working fluid is contained. In the illustrated construction of the energy storage system 10, the accumulator 26 is positioned within the reservoir 22 and is at least partially immersed in the working fluid contained within the interior chamber 50. Alternatively, the accumulator 26 may only be at least partially positioned within the reservoir 22, such that less of the accumulator 26 is immersed in the working fluid compared to the position of the accumulator 26 in FIG. 1. Also, in the illustrated construction of the energy storage system 10, the accumulator 26 includes a flange 54 to facilitate mounting the accumulator 26 to the reservoir 22. Any of a number of different structural elements (e.g., fasteners, etc.), processes (e.g., welding, adhering, etc.), or a combination of structural elements and processes may be employed to secure the flange 54, and therefore the accumulator 26, to the reservoir 22.

With continued reference to FIG. 1, the reservoir 22 includes a single, low-pressure inlet/outlet port 58 in fluid communication with the fluid passageway 34 through which working fluid passes to enter or exit the reservoir 22. Likewise, the accumulator 26 includes a single, high-pressure inlet/outlet port 62 in fluid communication with the fluid passageway 42 through which working fluid passes to enter or exit the accumulator 26. Alternatively, the reservoir 22 may include more than one low-pressure inlet/outlet port 58. In such a configuration of the reservoir, the plurality of low-pressure inlet/outlet ports 58 may be paired with respective fluid passageways 34.

In the illustrated construction of the system 10, the reservoir 22 is substantially air-tight (i.e., "closed") and is capable of maintaining air within the reservoir 22 at atmospheric pressure (e.g., 0 psi gauge) or at a pressure higher than atmospheric pressure. Alternatively, the reservoir 22 may be open to the atmosphere and include a breather to permit an exchange of air with the atmosphere. The interior chamber 50 of the reservoir 22 includes an air space 66 surrounding the accumulator 26, above the working fluid. As previously mentioned, the air space 66 may include air at atmospheric pressure or at a pressure higher than atmospheric pressure. Pressurization of the reservoir 22 (i.e., providing air in the air space 66 at a pressure higher than atmospheric pressure) substantially ensures that the pressure of the working fluid at the inlet of the pump/motor 18 (and the inlet/outlet port 58 of the reservoir 22) is maintained at a level sufficient to substantially prevent cavitation of the pump/motor 18 when operating as a pump.

In the illustrated construction of the system 10, the reservoir 22 is schematically illustrated as having a generally cylindrical shape. However, the reservoir 22 may be configured having any of a number of different shapes to conform with the structure of a hybrid vehicle within which the reservoir 22 is located. In addition, the reservoir 22 may be made from any of the number of different materials (e.g., metals, plastics, composite materials, etc.). Also, in the illustrated construction of the system 10, the reservoir 22 is schematically illustrated in a vertical orientation. However, the reservoir 22 may be positioned in any of a number of different orientations in the hybrid vehicle incorporating the system 10. For example, the reservoir 22 may be oriented upright (i.e., vertical) in the vehicle, laid flat (i.e., horizontal), or positioned at an incline at any angle between a horizontal orientation of the reservoir 22 and a vertical orientation of the reservoir 22.

Figure 4:
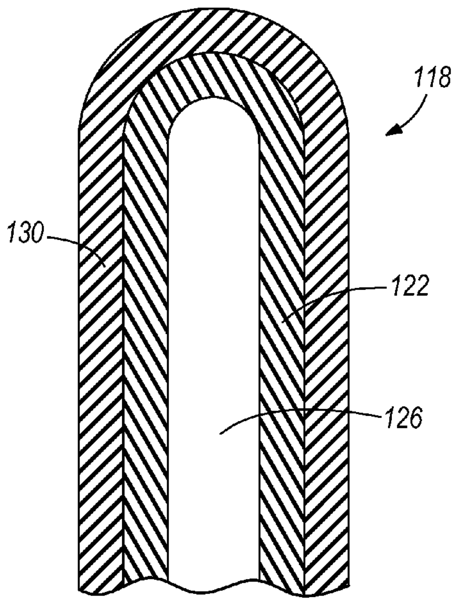
FIG. 4 is a cross-sectional view of a multi-layer bladder which can be used in the expandable accumulator of FIGS. 1-3.

With continued reference to FIG. 1, the accumulator 26 is configured as an expandable accumulator 26, in which the internal volume or space of the accumulator 26 is variable depending upon the amount of working fluid contained within the accumulator 26. In the illustrated construction of the system 10, the accumulator 26 includes an expandable tube 70 having opposed ends 74, 78 and an interior space 82 between the ends 74, 78. The inlet/outlet port 62 is positioned in the top end 74 (as viewed in FIG. 1) of the tube 70, and a clamp 86 couples the inlet/outlet port 62 to the tube 70. The clamp 86 also functions as a seal to substantially prevent leakage of working fluid between the top end 74 and the inlet/outlet port 62. One or more seals (e.g., O-rings, gaskets, etc.) may also be utilized to seal the clamp 86 to the inlet/outlet port 62, and the clamp 86 to the top end 74 of the tube 70. Another clamp 90 is coupled to the bottom end 78 (as viewed in FIG. 1) of the tube 70 to close the bottom end 78 of the tube 70 and prevent the exchange of working fluid between the accumulator 26 and the reservoir 22 via the bottom end 78. One or more seals (e.g., O-rings, gaskets, etc.) may be utilized to seal the clamp 90 to the bottom end 78 of the tube 70. Alternatively, a bladder 118 having only a single open end (i.e., the end adjacent the inlet/outlet port 62) may be used with the accumulator 26 in place of the tube 70 (FIG. 4).

With reference to FIG. 1, the accumulator 26 may include a de-aerating valve 94 coupled to the clamp 90 and in fluid communication with the interior space 82 of the tube 70. Such a de-aerating valve 94 (e.g., a spring-biased ball valve) assumes an open configuration when the accumulator 26 is not pressurized to permit the escape of entrained air from the accumulator 26 to the reservoir 22, where the entrained air is allowed to rise through the working fluid to the air space 66. The de-aerating valve 94 then assumes a closed configuration when the accumulator 26 is pressurized to prevent the pressurized working fluid in the accumulator 26 from leaking into the reservoir 22.

With continued reference to FIG. 1, the accumulator 26 includes a plurality of supports 98 that are engageable with the outer periphery of the tube 70 to limit the extent to which the tube 70 may expand when pressurized working fluid is transferred from the reservoir 22 to the accumulator 26. Although discrete supports 98 "smooth formers" are shown with the illustrated accumulator 26, a single cage may alternatively be positioned around the outer periphery of the tube 70 and spaced from the outer periphery of the tube 70 by a particular distance corresponding with the desired extent to which the tube 70 may expand. Such a cage may also be shaped to define and limit the expanded shape of the accumulator 26 (e.g., to the expanded shape of the accumulator 26 shown in FIG. 2).

Figure 2:
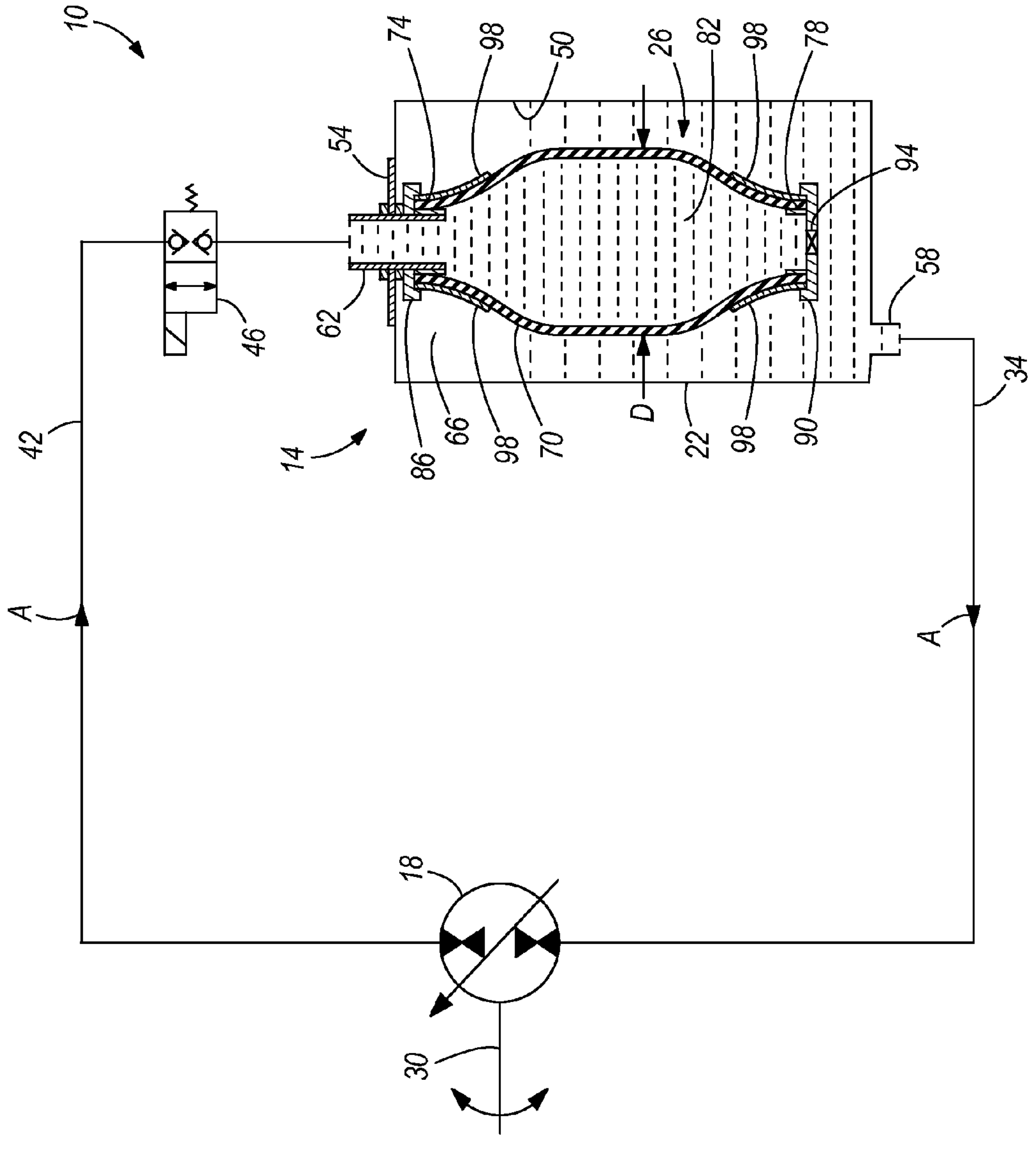
FIG. 2 is a schematic of the energy storage system of FIG. 1, illustrating the accumulator in an expanded configuration in response to receiving pressurized working fluid from the reversible pump/motor when operating as a pump.

The expandable tube 70 or bladder is made from an elastomeric material (e.g., polyurethane, natural rubber, polyisoprene, fluoropolymer elastomers, nitriles, etc.) to facilitate deformation of the tube 70 in response to pressurized working fluid being pumped into the accumulator 26 when the reversible pump/motor 18 is operating as a pump. Specifically, as shown in FIG. 2, a radial dimension D corresponding with the outer diameter of a middle portion of the tube 70 varies in response to pressurized working fluid filling and exiting the accumulator 26. However, the outer diameter of the tube 70 adjacent each of the ends 74, 78 is maintained substantially constant by the respective clamps 86, 90. The accumulator 26 is operable to exert a compressive force on the working fluid in the tube 70 as the radial dimension D increases from a value corresponding with the unstretched or undeformed tube 70 (see FIG. 1). In other words, the pressurized working fluid entering the accumulator 26 performs work on the tube 70 to stretch or expand the tube 70 to the shape shown in FIG. 2. This energy is stored in the tube 70 at a molecular level, and is proportional to the amount of strain experienced by the tube 70.

Applicants have discovered through testing that when the interior of a homogeneous tube 70 (i.e., a tube 70 having only a single layer, without reinforcing fibers) is pressurized, most of the strain energy stored in the tube 70 is concentrated near the inner surface of the tube 70. Applicants have also discovered that the concentration of strain energy stored in the tube 70 decreases with an increasing radial position along the thickness of the tube 70. In other words, the material proximate the outer surface of the tube 70 contributes less to the storage of strain energy than the material proximate the inner surface of the tube 70. To increase the uniformity of distribution of strain energy along the thickness of the tube 70, a multi-layer construction may be used in which an innermost layer of the tube includes a higher fracture strain (i.e., the strain at which fracture occurs during a tensile test) than an outermost layer, and in which the outermost layer includes a higher stiffness than the innermost layer. Because such a multi-layer tube can more efficiently store strain energy along its thickness, the maximum internal pressure that the tube is capable of handling would also be increased compared to the single-layer tube 70.

As shown in FIG. 4, the bladder 118 includes an inner layer 122 defining an interior space 126 in which working fluid is contained, and an outer layer 130 surrounding the inner layer 122. It should also be understood that the same configuration could be implemented as a tube having opposed open ends. The outer layer 130 is in contact with the working fluid in the reservoir 22 when the bladder 118 is used with the accumulator, and the accumulator 26 is immersed in the working fluid. The inner layer 122 includes a higher fracture strain than the outer layer 130, and the outer layer 130 includes a higher stiffness (i.e., modulus of elasticity) than the inner layer 122. In a construction of the bladder 118 in which at least 200 kJ of strain energy may be stored at an internal pressure between about 3,000 psi and about 6,000 psi, the fracture strain of the inner layer 122 may be between about 30% and about 70% greater than the fracture strain of the outer layer 130. Likewise, under the same conditions, the stiffness of the outer layer 130 may be between about 30% and about 70% greater than the stiffness of the inner layer 122.

In addition to providing the performance characteristics discussed above, the materials comprising the inner and outer layers 122, 130 of the bladder 118 may be selected such that each of the layers 122, 130 may be resistant to the working fluid such that deterioration of either of the layers 122, 130 after prolonged contact with the working fluid is substantially inhibited. For example, the inner and outer layers 122, 130 of the bladder 118 may be made from an elastomer including a nitrile butadiene rubber (NBR), a fluoropolymer elastomer (e.g., VITON), a polyurethane polymer, an elastic hydrocarbon polymer (e.g., natural rubber), and so forth. Each of the inner and outer layers 122, 130 may be made from different grades of material within the same material family. Alternatively, the inner and outer layers 122, 130 may be made from materials having distinctly different chemistry.

With continued reference to FIG. 4, the inner and outer layers 122, 130 of the bladder 118 may be separately formed and assembled such that the inner surface of the outer layer 130 conforms to the outer surface of the inner layer 122. The outer layer 130 may or may not be bonded to the inner layer 122 (e.g., using adhesives, etc.). Alternatively, the inner and outer layers 122, 130 of the bladder 118 may be co-molded such that subsequent assembly of the layers 122, 130 is not required. For example, concentric inner and outer layers of a multi-layer tube (not shown) may be co-extruded layer by layer.

Figure 3:
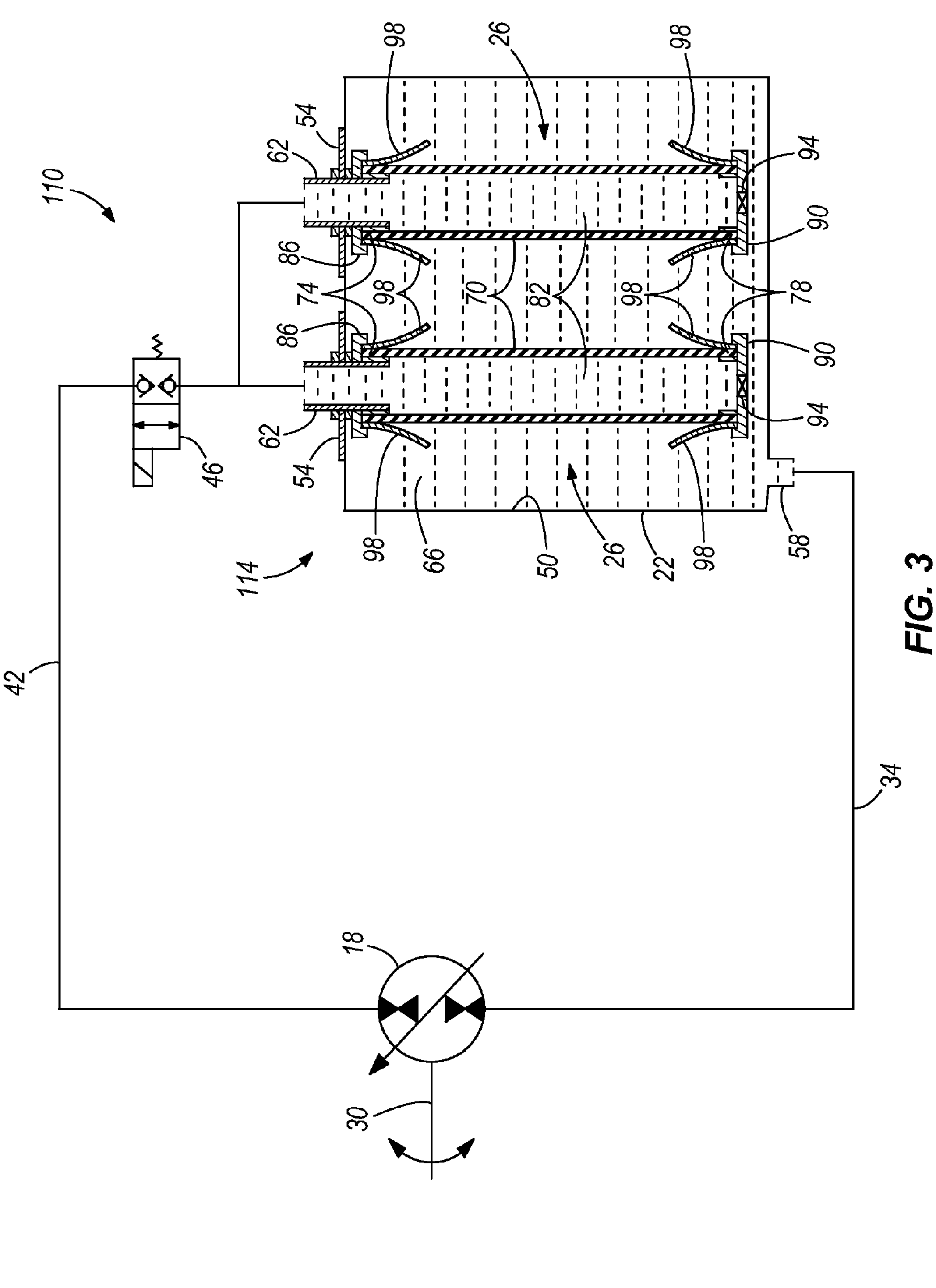
FIG. 3 is a schematic of a second construction of an energy storage system of the present invention, illustrating a reservoir and multiple accumulators positioned within the reservoir.
Figure 5:
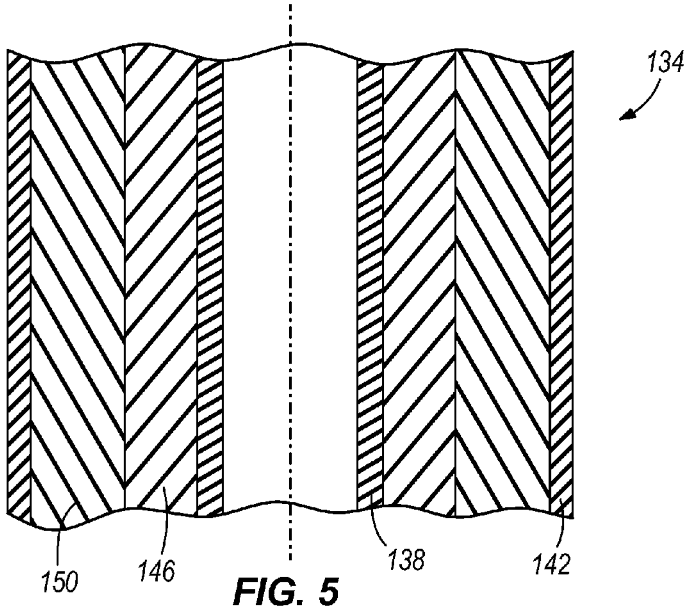
FIG. 5 is a cross-sectional view of a multi-layer tube or bladder which can be used in the expandable accumulator of FIGS. 1-3.

With reference to FIG. 5, another multi-layer construction of a tube or bladder 134 is shown that may be used in the accumulator 26 of FIGS. 1-3. The tube or bladder 134 includes four layers—an inner layer 138, an outer layer 142, and two interior layers 146, 150. Like the bladder 118 of FIG. 4, the inner layer 138 includes a higher fracture strain than the outer layer 142, and the outer layer 142 includes a higher stiffness than the inner layer 138. In some constructions of the tube or bladder 134, the fracture strain of the layers 138, 146, 150, 142 may progressively decrease from the inner layer 138 to the outer layer 142. For example, the fracture strain of the layers 138, 146, 150, 142 may progressively decrease in accordance with a linear or nonlinear (e.g., a second order, third order, etc.) relationship. Likewise, the stiffness of the layers 138, 146, 150, 142 may progressively increase from the inner layer 138 to the outer layer 142 in accordance with a linear or nonlinear (e.g., a second order, third order, etc.) relationship.

The layers 138, 146, 150, 142 may be made from the same materials discussed above with respect to the bladder 118 of FIG. 4. However, only the inner and outer layers 138, 142 of the tube or bladder 134 need to be made from a material that is resistant to the working fluid because the interior layers 146, 150 are not in contact with the working fluid when the accumulator 26 is immersed in the working fluid. As such, the interior layers 146, 150 may be made from a material that possesses desirable strain energy properties, yet lacks resistivity to the working fluid. In one construction of the tube or bladder 134, the thicknesses of the layers 138, 142 may be relatively small compared to the thicknesses of the interior layers 146, 150, such that the interior layers 146, 150 are primarily used for energy storage, while the inner and outer layers 138, 142 are primarily used as barriers to shield the interior layers 146, 150 from the working fluid. In such a construction, the layers 138, 142 may contribute a very small or negligible amount to the overall energy storage capability of the tube or bladder 134, such that the fracture strain or stiffness values of the layers 138, 142 need not be chosen in relation to those values of the interior layers 146, 150. In other words, the "inner" interior layer 146 may include a higher fracture strain than the "outer" interior layer 150, however, the inner layer 138 need not have a higher fracture strain than the interior layer 146.

The individual layers 138, 146, 150, 142 may be separately formed and assembled such that the mating surfaces of the layers 138, 146, 150, 142 conform to each other. The layers 138, 146, 150, 142 may or may not be bonded together. Alternatively, the layers 138, 146, 150, 142 may be co-molded such that subsequent assembly of the layers 138, 146, 150, 142 is not required. For example, when configured as a tube 134, the layers 138, 146, 150, 142 may be co-extruded layer by layer.

Figure 6:
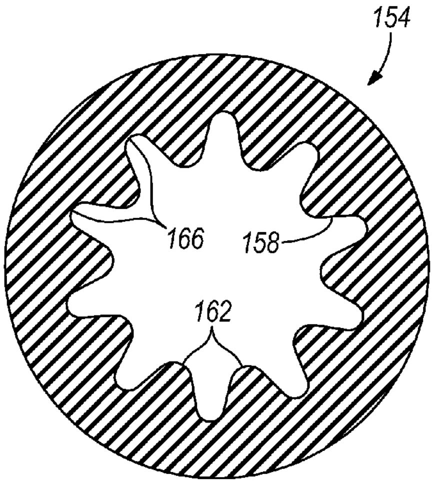
FIG. 6 is a cross-sectional view of a tube or bladder, which can be used in the expandable accumulator of FIGS. 1-3, having a non-circular inner surface.

With reference to FIG. 6, another construction of a tube or bladder 154 is shown having a single layer with an inner surface 158 defining a non-circular cross-sectional shape. Particularly, the inner surface 158 of the tube or bladder 154 includes alternating peaks 162 and valleys 166 spanning the length of the tube or bladder 154 (i.e., into the page of FIG. 6). Such a configuration of the tube or bladder 154 would also increase the uniformity of distribution of strain energy along the thickness of the tube or bladder 154.

In operation, when the system 10 recovers kinetic energy from the rotating shaft 30, the pump/motor 18 operates as a pump to draw working fluid from the reservoir 22 (via the inlet/outlet port 58) in the direction of arrow A (see FIG. 2), pressurize the working fluid, and pump the pressurized working fluid into the interior space 82 of the tube 70 through the open isolation valve 46 and the inlet/outlet port 62. The accumulator 26 expands or stretches in response to the pressurized working fluid entering the tube 70. The expansion of the accumulator 26 occurs progressively along the length of the accumulator 26 as working fluid is pumped into the accumulator 26 (see, for example, the expansion of the accumulators 26*a*, 26*b* in FIGS. 9-11 and 12-13) at a substantially constant pressure.

As working fluid exits the reservoir 22, the volume of the air space 66 above the working fluid is substantially unchanged because the working fluid is merely transferred from outside the tube 70 (as shown in FIG. 1) to inside the tube 70 (as shown in FIG. 2). In other words, the combination of the accumulator 26 and the reservoir 22 substantially mimics a control volume, in which the volume of working fluid exiting the reservoir 22 is substantially equal to the volume of working fluid entering the accumulator 26. Likewise, the volume of working fluid exiting the accumulator 26 is substantially equal to the volume of working fluid returning to the reservoir 22.

Consequently, the total volume of working fluid maintained within the accumulator 26 and the reservoir 22 at any given time during operation of the system 10 is substantially constant. In addition, because the volume of the air space 66 is maintained substantially constant during operation of the system 10, working fluid may be drawn from the reservoir 22 and returned to the reservoir 22 without an exchange of gas or air with the atmosphere (i.e., drawing replacement air from the atmosphere or venting air to the atmosphere). After the kinetic energy of the rotating shaft 30 is recovered, the isolation valve 46 is actuated to a closed configuration, and the tube 70 exerts a compressive force on the working fluid to maintain the working fluid at a high pressure within the accumulator 26.

When the hybrid vehicle requires propulsion assistance, the isolation valve 46 is actuated to an open configuration to permit the flow of pressurized working fluid in the direction of arrow B (see FIG. 1) from the accumulator 26. As mentioned above, the energy used for propulsion assistance is stored in the tube 70 at a molecular level, and is proportional to the amount of strain experienced by the tube 70. High-pressure working fluid flows from the accumulator 26, through the fluid passageway 42, and into the pump/motor 18 to operate the pump/motor 18 as a motor to drive the shaft 30. The pump/motor 18 then returns the low-pressure working fluid to the reservoir 22 via the fluid passageway 34 and the inlet/outlet port 58. As working fluid is returned to the reservoir 22, the volume of the air space 66 above the working fluid is substantially unchanged because the working fluid is merely transferred from inside the tube 70 (as shown in FIG. 2) to outside the tube 70 (as shown in FIG. 1). As previously mentioned, the combination of the accumulator 26 and the reservoir 22 substantially mimics a control volume, in which the total volume of working fluid maintained within the accumulator 26 and the reservoir 22 at any given time during operation of the system 10 is substantially constant.

With reference to FIG. 3, a second construction of an energy storage system 110 is shown including an assembly 114 having dual accumulators 26 positioned in the reservoir 22 to enhance the energy storage capacity of the system 110. Like components are labeled with like reference numerals, and will not be described again in detail.

Figure 7:
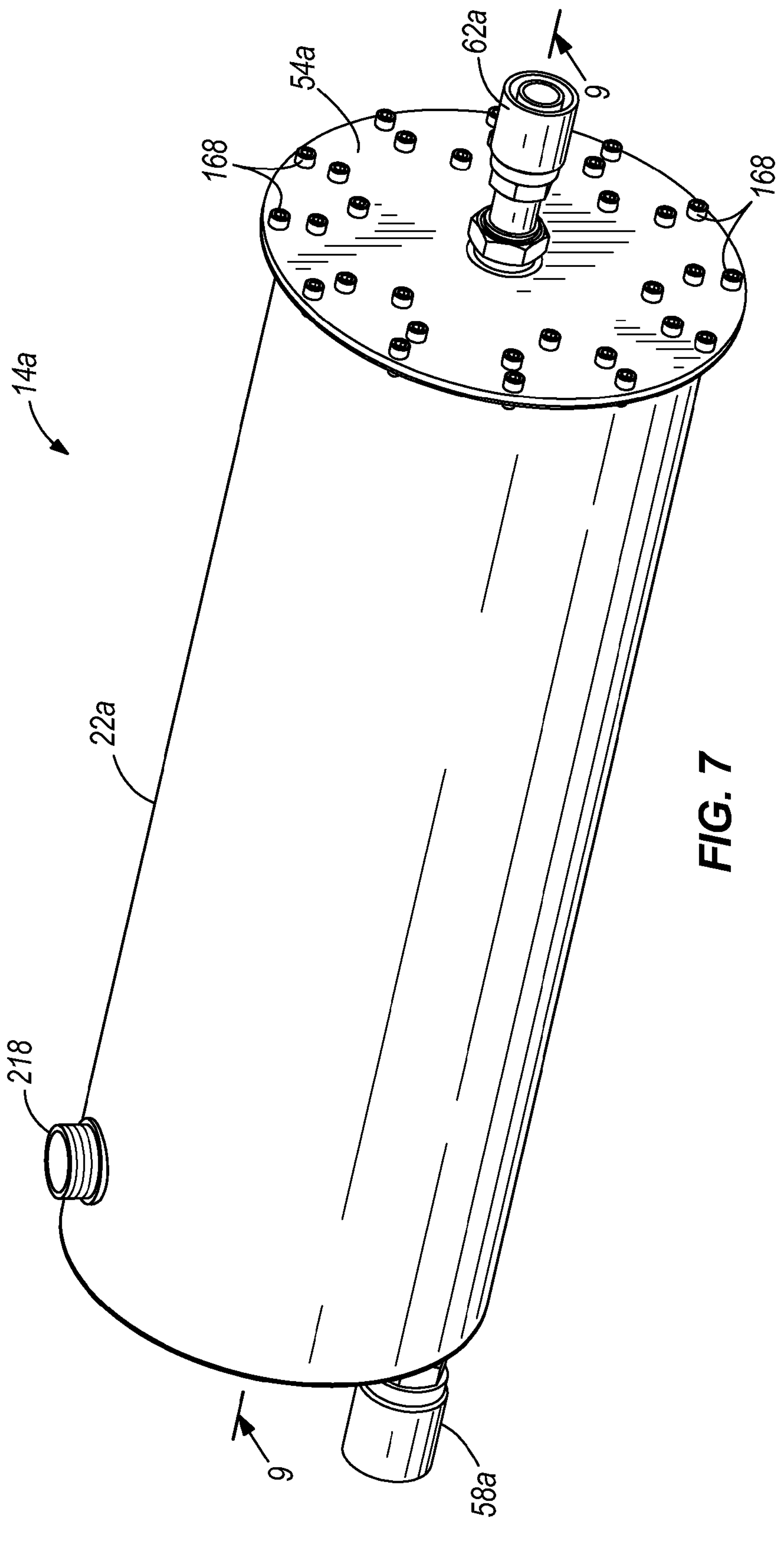
FIG. 7 is a perspective view of a reservoir and an expandable accumulator assembly
Figure 8:
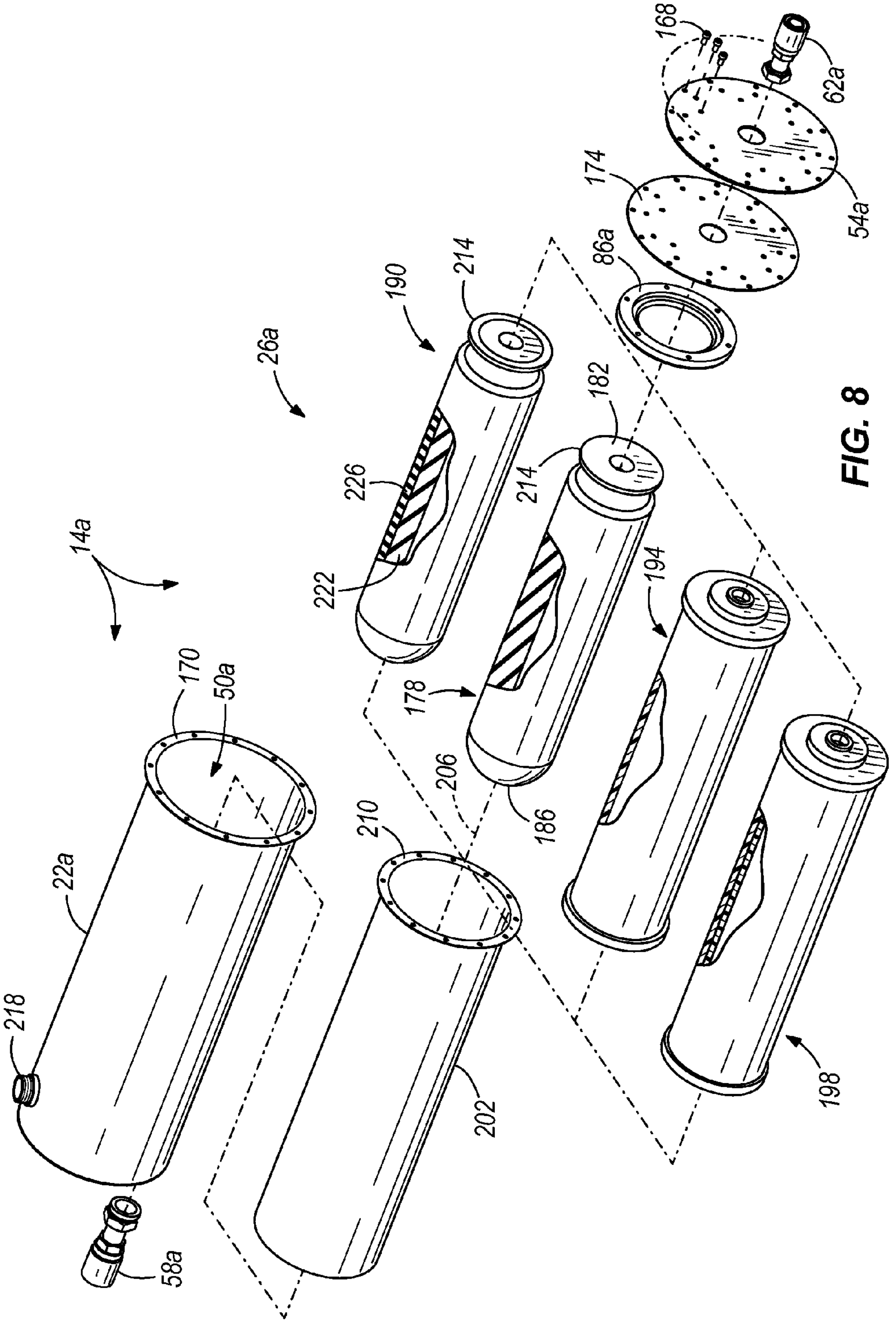
FIG. 8 is an exploded perspective view of the assembly of FIG. 7, illustrating several constructions of the expandable accumulator.

FIGS. 7 and 8 illustrate an accumulator and reservoir assembly 14*a* that may be used in the system 10 of FIGS. 1 and 2. Like components are labeled with like reference numerals with the letter "a." In the illustrated construction of the reservoir 22*a*, the flange 54*a* is fastened (i.e., using bolts 168) to a corresponding flange 170 on the reservoir 22*a* to seal the interior chamber 50*a* (FIG. 8). A gasket 174 is positioned between the flange 54*a* and the reservoir 22*a* to facilitate sealing the flange 54*a* to the reservoir 22*a*. Alternatively, any of a number of different seals (e.g., O-rings, etc.) may be positioned between the flange 54*a* and the reservoir 22*a* to facilitate sealing. Alternatively, any of a number of different fasteners or quick-release arrangements may be utilized to secure the flange 54*a* to the reservoir 22*a*.

Figure 9:
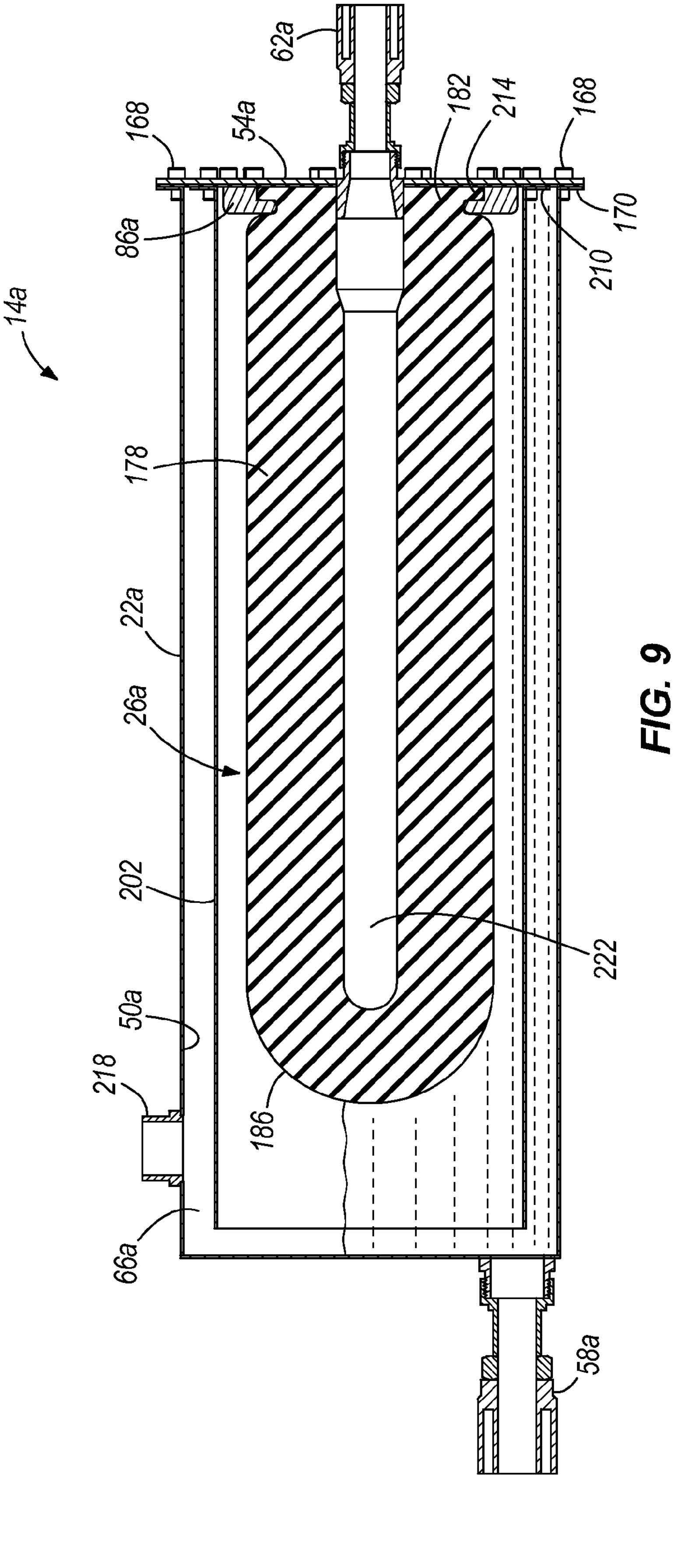
FIG. 9 is a cross-sectional view of the assembly of FIG. 7 along line 9-9, illustrating the accumulator in an unexpanded state.
Figure 10:
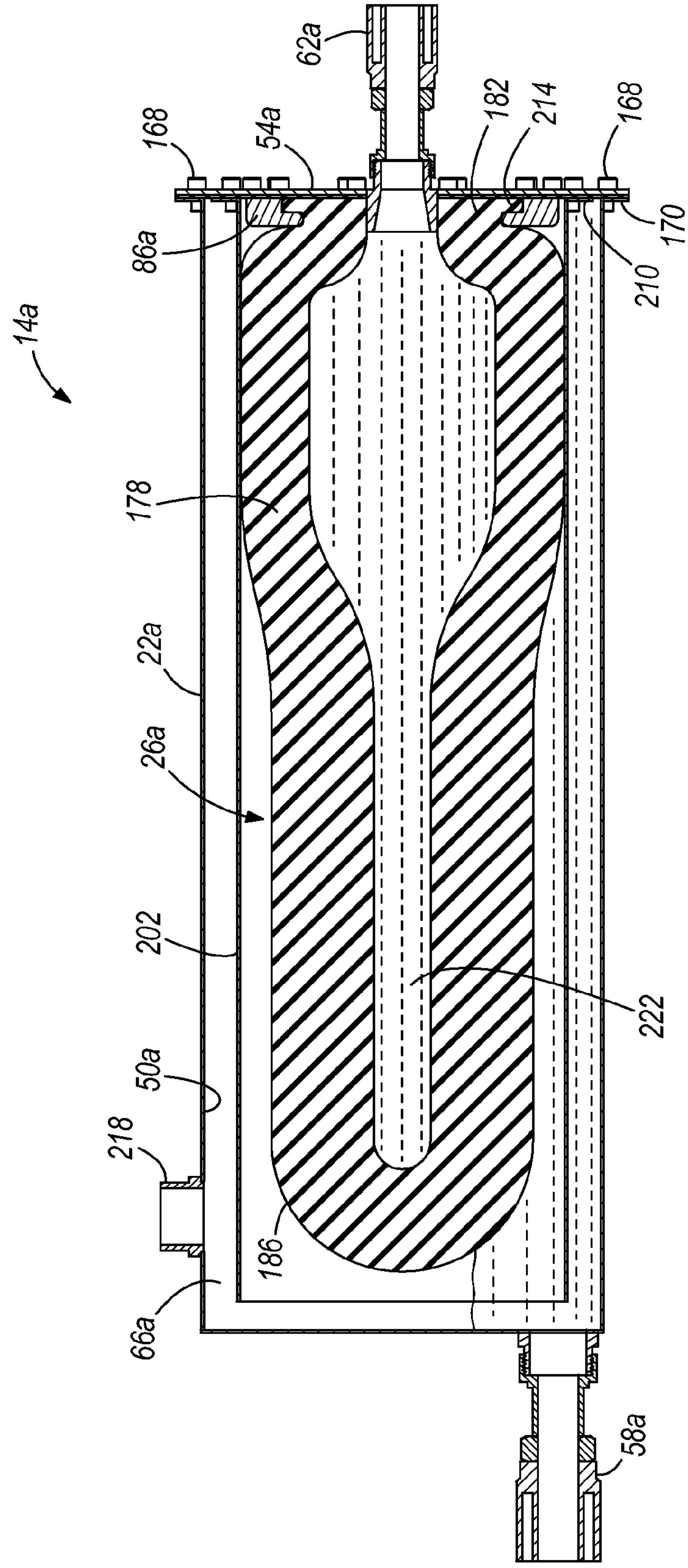
FIG. 10 is a cross-sectional view of the assembly of FIG. 9, illustrating the accumulator in a partially expanded state.

With reference to FIG. 9, the expandable accumulator 26*a* is configured as a single-layer bladder 178 having an open end 182 in fluid communication with the high-pressure inlet/outlet port 62*a*, and a closed end 186. Alternatively, the accumulator 26*a* may be configured as a multi-layer bladder 190, a single-layer tube 194, or a multi-layer tube 198 having material properties as discussed above (FIG. 8). With reference to FIG. 9, the assembly 14*a* also includes a support or a cage 202 coaxial with a central axis 206 (FIG. 8) of the reservoir 22*a* and the inlet/outlet port 62*a*. In the illustrated construction of the assembly 14*a*, the cage 202 is configured as a cylindrical, rigid tube extending the length of the bladder 178. The flange 54*a* is fastened (i.e., using bolts 168) to a corresponding flange 210 on the cage (FIG. 8) to maintain the cage 202 coaxial with the reservoir 22*a*. The clamp 86*a* is also fastened (i.e., using bolts) to the flange 54*a* to maintain the accumulator 26*a* coaxial with the reservoir 22*a* and the cage 202. In the illustrated construction of the assembly 14*a* as shown in FIG. 9, the clamp 86*a* is configured as a ring configured to secure an end or lip portion 214 of the accumulator 26*a* between the clamp 86*a* and the flange 54*a*. Alternatively, the clamp 86*a* may be configured in any of a number of different ways to secure the accumulator 26*a* to the flange 54*a*, and therefore to the reservoir 22*a*.

As discussed above, the cage 202 is spaced from the outer periphery of the bladder 178 by a particular distance corresponding with the desired extent to which the bladder 178 may expand. The end of the cage 202 proximate the low-pressure inlet/outlet port 58*a* is also spaced from the end of the reservoir 22*a* a sufficient distance to permit free-flow of working fluid between locations in the interior chamber 50*a* inside the cage 202 and outside the cage 202. With reference to FIGS. 7-9, the reservoir 22*a* includes a fill port 218 in fluid communication with the interior chamber 50*a* to permit the reservoir 22*a* to be refilled with working fluid when necessary. Although not shown, a cap may be secured to the fill port 218 to seal the reservoir 22*a*.

Figure 11:
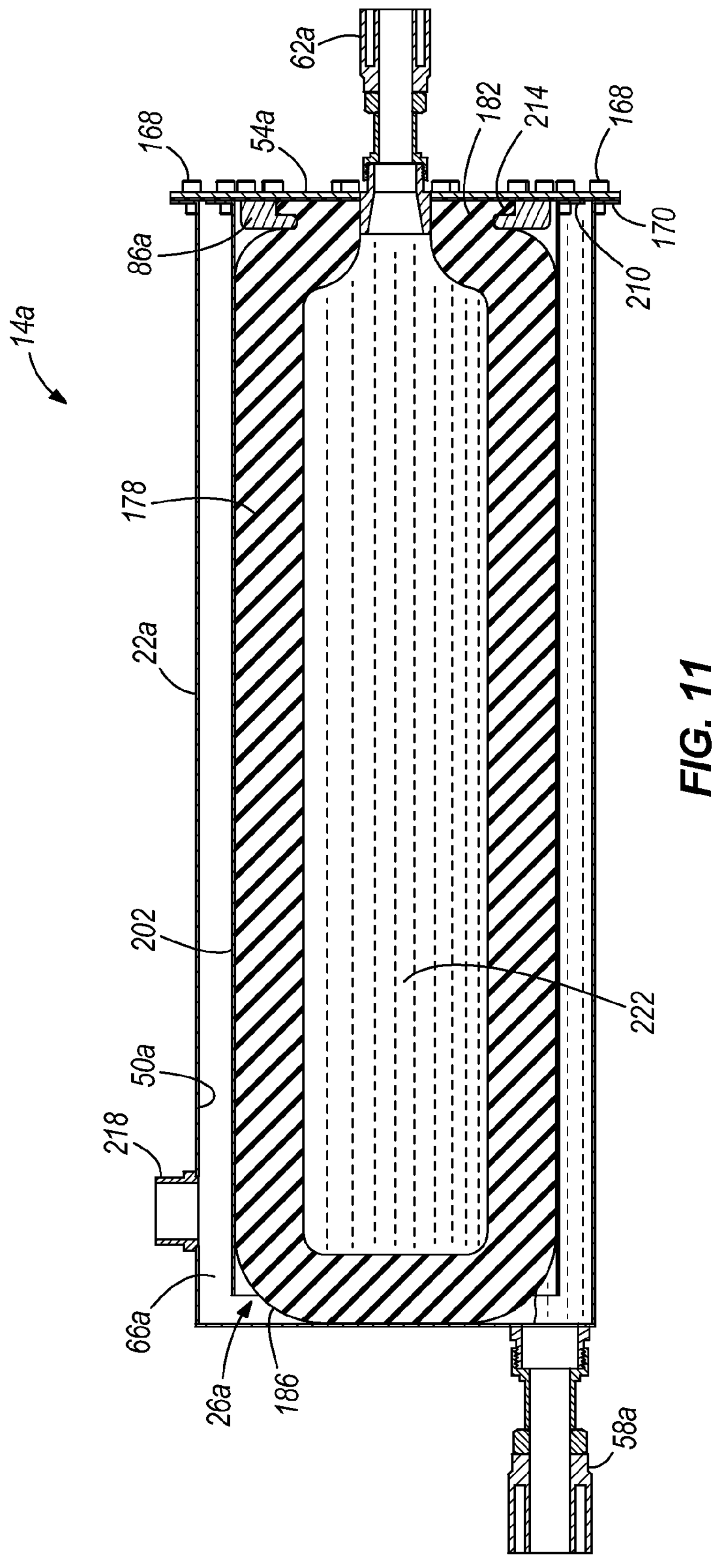
FIG. 11 is a cross-sectional view of the assembly of FIG. 9, illustrating the accumulator in a fully expanded state.

With reference to FIG. 9, the bladder 178 includes a variable internal volume 222 which increases as working fluid is received within the bladder 178 at a relatively constant pressure. As discussed above, Applicants have discovered through testing that most of the strain energy stored in the bladder 178 is concentrated near the inner surface of the bladder 178. In other words, the material proximate the inner surface of the bladder 178 is compressed in a radially outward direction as pressurized working fluid is received in the bladder 178 (see FIGS. 10 and 11), effectively causing the internal volume 222 of the bladder 178 to progressively increase along the length of the bladder 178. In some constructions of the bladder 178, the variable internal volume 222 is configured to be increased up to about 13 times an initial internal volume corresponding with an unexpanded state of the bladder 178 (FIG. 9). As a result, up to about 75% of the working fluid in the reservoir 22*a* can be exchanged with the bladder 178 as the bladder 178 is expanded from its unexpanded state (FIG. 9) to its fully expanded state (FIG. 11). In the illustrated construction of the assembly 14*a*, the reservoir 22*a* is configured to contain 30 liters of working fluid, while the bladder 178 is configured to contain at least 22 liters of the working fluid when it is fully expanded as shown in FIG. 11. Alternatively, the reservoir 22*a* may be sized appropriately to contain more or less working fluid.

With reference to FIGS. 9 and 11, the bladder 178 may occupy between about 40% and about 70% of the internal volume (which is defined by the interior chamber 50*a*) of the reservoir 22*a* depending upon the amount of working fluid in the bladder 178. For example, as shown in FIG. 9, the bladder 178 occupies about 40% of the internal volume of the reservoir 22*a* when in its unexpanded state. However, when the bladder 178 is filled with working fluid as shown in FIG. 11, the bladder 178 occupies about 70% of the internal volume of the reservoir 22*a*. When operating at a system pressure of about 3,000 psi, the bladder 178 is configured to store at least about 150,000 ft-lbs of energy when completely filled with working fluid as shown in FIG. 11, which is sufficient to provide propulsion assistance to a two-ton vehicle (e.g., a car or pickup truck). When operating at a system pressure of about 6,000 psi, the bladder 178 is configured to store at least about 750,000 ft-lbs of energy when completely filled with working fluid as shown in FIG. 11, which is sufficient to provide propulsion assistance to a ten-ton vehicle (e.g., a single axle delivery truck).

In one construction, the assembly 14*a* occupies only about 3.6 cubic feet of space. Such a relatively small package is possible as a result of positioning the bladder 178 within the reservoir 22*a*, and by permitting the bladder 178 to occupy up to about 70% of the internal volume of the reservoir 22*a* when the bladder 178 is fully charged with pressurized working fluid. With the available energy storage capabilities of the assembly 14*a* when operating between system pressures of 2,000 psi and 6,000 psi, the energy density (i.e., the stored energy divided by the occupied space of the storage device) of the assembly 14*a* may range between about 41,500 ft-lbs/cubic foot and about 208,500 ft-lbs/cubic foot. In comparison, the energy density of a conventional hybrid hydraulic system including a gas-charged accumulator and a separate low-pressure reservoir is about one-third to about one-fifth the energy density of the assembly 14*a*. Because the energy density of the assembly 14*a* is much higher than that of a conventional hybrid hydraulic system including a gas-charged accumulator and a separate low-pressure reservoir, the assembly 14*a* may be packaged much more efficiently within a vehicle or other machinery with which the assembly 14*a* is used.

Figure 12:
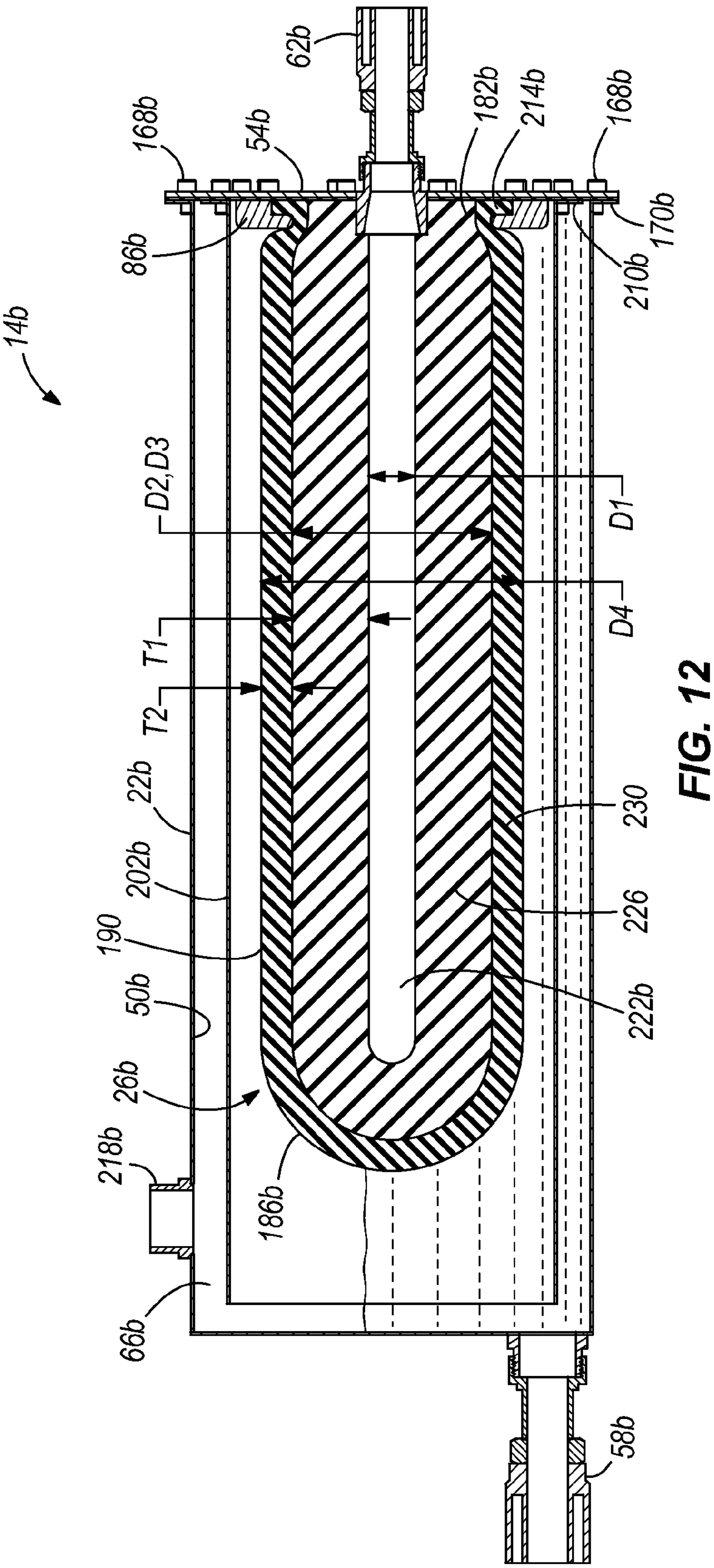
FIG. 12 is a cross-sectional view of the assembly of FIG. 7 with the accumulator configured as a multi-layer bladder, illustrating the bladder in an unexpanded state.
Figure 13:
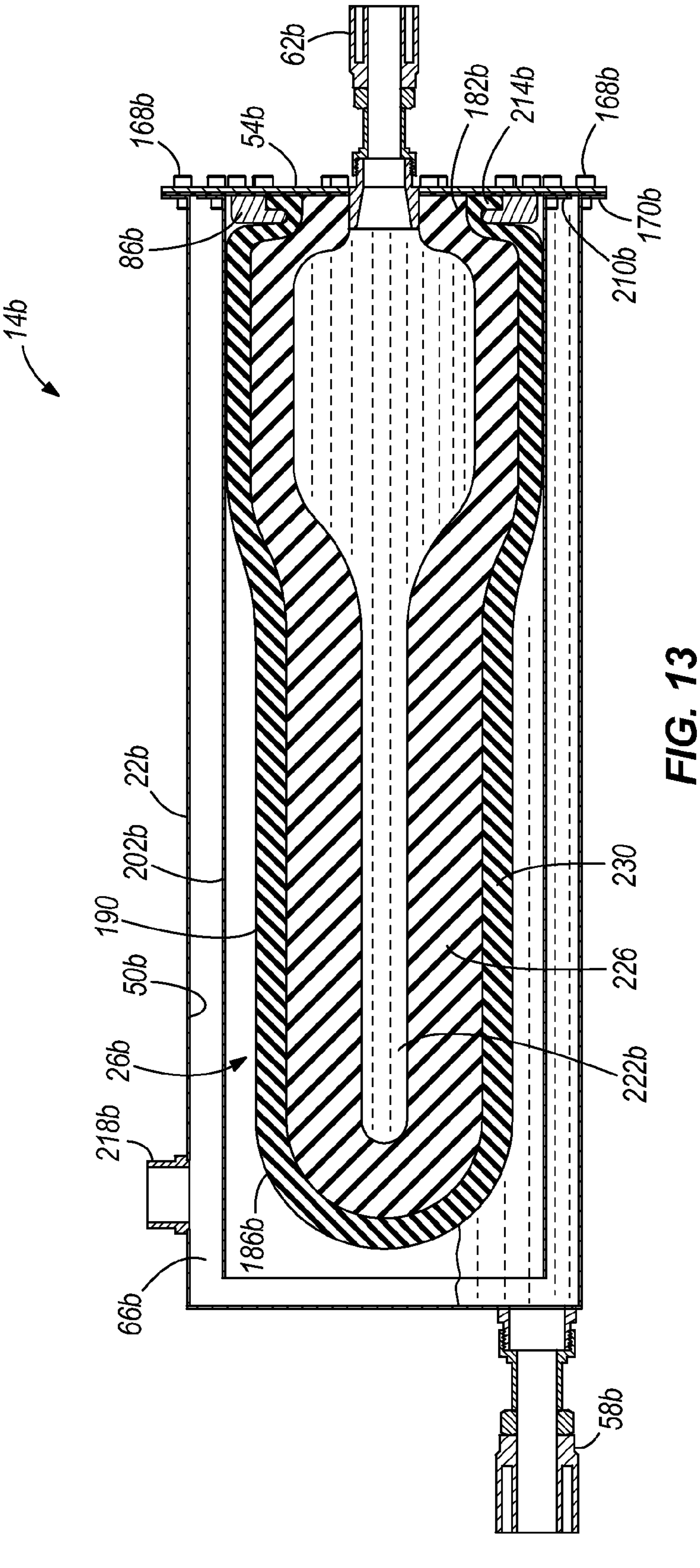
FIG. 13 is a cross-sectional view of the assembly of FIG. 12, illustrating the bladder in a partially expanded state.
Figure 14:
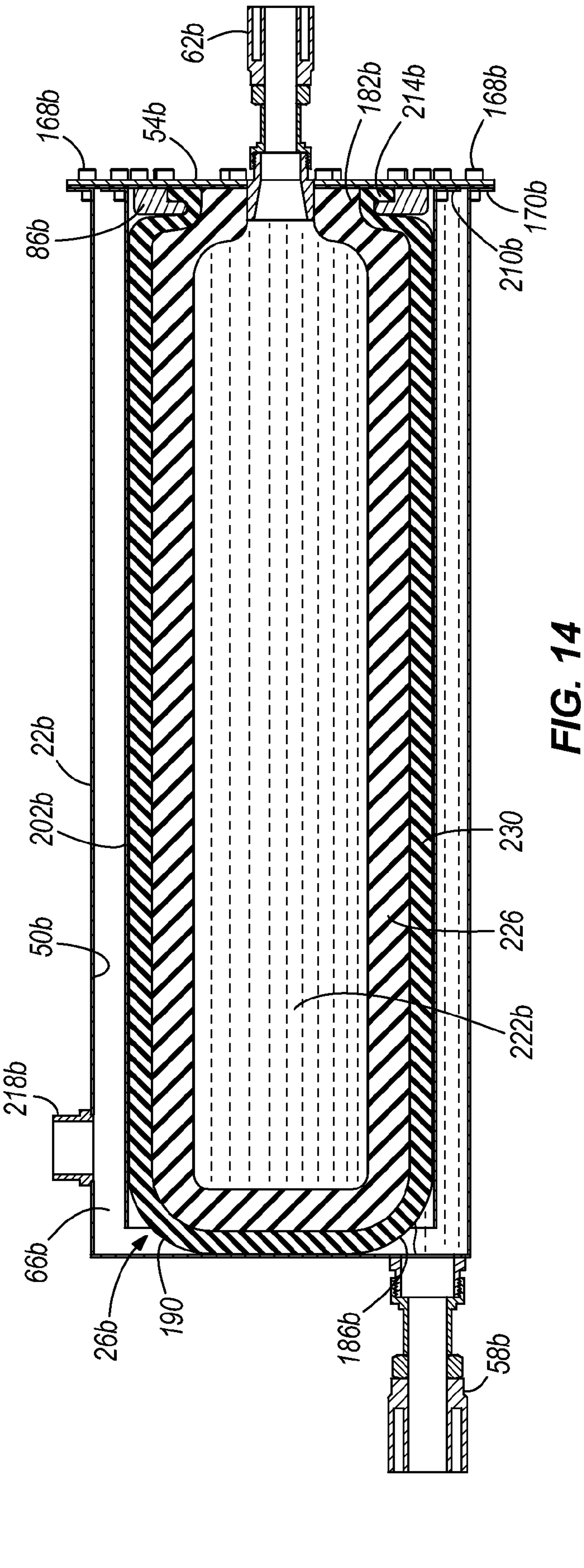
FIG. 14 is a cross-sectional view of the assembly of FIG. 12, illustrating the bladder in a fully expanded state.

FIGS. 12-14 illustrate another construction of an accumulator and reservoir assembly 14*b* which may be used in the system 10 of FIGS. 1 and 2. Like components are labeled with like reference numerals with the letter "b." The assembly 14*b* is identical to the assembly 14*a* of FIGS. 7-11, however, a multi-layer bladder 190, such as the bladder 118 shown in FIG. 4 and described above, replaces the single-layer bladder 178. The bladder 190 includes an inner layer 226 and an outer layer 230, and may be manufactured in a similar manner as described above with respect to the bladder 118. Alternatively, the bladder 190 may be configured having more than two layers, such as the tube or bladder 134 shown in FIG. 5.

In one construction of the multi-layer bladder 190 which Applicants have tested, the inner layer 226 includes an inner diameter D1 of about 2.25 inches and an outer diameter D2 of about 10.25 inches, and the outer layer 230 includes an inner diameter D3 of about 10.25 inches and an outer diameter D4 of about 13.25 inches. Therefore, the wall thickness T1 of the inner layer 226 is about 4 inches, while the wall thickness T2 of the outer layer 230 is about 1.5 inches. The values of these dimensions D1-D4, T1, T2 correspond with the unexpanded state of the bladder 190, as shown in FIG. 12. After filling the bladder 190 with working fluid at a pressure of about 5,000 psi, Applicants measured an increase in each of the dimensions D1-D4, and a decrease in each of the thicknesses T1, T2. Particularly, Applicants measured a decrease in the thickness T1 of about 47%, and a decrease in the thickness T2 of about 21%. Considering the total reduction of thickness associated with the dimensions T1, T2, up to about 85% of the total amount of reduced thickness occurs in the inner layer 226. Consequently, only about 15% of the total amount of reduced thickness occurs in the outer layer 230. Therefore, the particular materials, or grades of the same material, from which the inner and outer layers 226, 230 are made may be chosen to increase the uniformity of distribution of strain energy along the thickness of the bladder 190, thereby leading to increased performance and more predictable operation of the assembly 14*b*.

Operation of either of the assemblies 14*a*, 14*b* is substantially similar to the operation of the assembly 14 as described above.

Various features of the invention are set forth in the following claims.

What is claimed is:

1. An expandable accumulator and reservoir assembly comprising:
- a reservoir defining an interior chamber containing working fluid therein; and
- an expandable accumulator including an innermost layer and an outermost layer,
- wherein only an inner surface of the innermost layer is in contact with the working fluid and only an outer surface of the outermost layer is in contact with the working fluid when the working fluid is inside the accumulator and in the reservoir, wherein the innermost layer includes a higher fracture strain than the outermost layer, wherein the accumulator is at least partially positioned in the reservoir and at least partially immersed in the working fluid contained within the interior chamber, and wherein the accumulator is configured to exchange working fluid with the reservoir.

2. The expandable accumulator and reservoir assembly of claim 1, wherein, during exchange of working fluid between the reservoir and the accumulator, the volume of working fluid removed from the reservoir is substantially equal to the volume of the working fluid received by the accumulator.

3. The expandable accumulator and reservoir assembly of claim 1, wherein, during exchange of working fluid between the accumulator and the reservoir, the volume of working fluid discharged from the accumulator is substantially equal to the volume of the working fluid returned to the reservoir.

4. The expandable accumulator and reservoir assembly of claim 1, wherein the accumulator is a first accumulator, and wherein the assembly further includes a second expandable accumulator at least partially positioned in the reservoir and at least partially immersed in the working fluid contained within the interior chamber.

5. The expandable accumulator and reservoir assembly of claim 1, wherein the outermost layer includes a higher stiffness than the innermost layer.

6. The expandable accumulator and reservoir assembly of claim 1, wherein the innermost layer and the outermost layer are resistant to the working fluid such that deterioration of the innermost layer and the outermost layer after prolonged contact with the working fluid is substantially inhibited.

7. The expandable accumulator and reservoir assembly of claim 6, wherein the accumulator includes an intermediate layer between the innermost layer and the outermost layer, and wherein the intermediate layer need not be resistant to the working fluid.

8. The expandable accumulator and reservoir assembly of claim 1, wherein the outermost layer is co-extruded with the innermost layer.

9. The expandable accumulator and reservoir assembly of claim 1, wherein the expandable accumulator includes
- one of a tube and a bladder, and
- a support engageable with an outer periphery of the one of the tube and the bladder to limit expansion of the one of the tube and bladder upon receipt of pressurized working fluid in the one of the tube and bladder.

10. The expandable accumulator and reservoir assembly of claim 9, wherein the at least one support is configured as a cage substantially surrounding the one of the tube and bladder.

11. The expandable accumulator and reservoir assembly of claim 1, wherein the expandable accumulator includes
- an expandable tube defining a first end, a second end, and an interior space between the first and second ends,
- an inlet/outlet port in fluid communication with the interior space and positioned proximate the first end of the tube, and
- a de-aerating valve in fluid communication with the interior space and positioned proximate the second end of the tube.

12. The expandable accumulator and reservoir assembly of claim 1, wherein the innermost layer and the outermost layer of the expandable accumulator are elastic, and wherein the accumulator alone is configured to exert a compressive force on pressurized working fluid in the accumulator.

13. The expandable accumulator and reservoir assembly of claim 1, wherein the accumulator is configured to exchange working fluid with the reservoir without a corresponding exchange of gas with the atmosphere.

14. The expandable accumulator and reservoir assembly of claim 1, wherein the expandable accumulator is configured as one of a single bladder and a single tube, and wherein the one of the single bladder and tube is configured to store at least about 150,000 ft-lbs of energy.

15. The expandable accumulator and reservoir assembly of claim 1, wherein the reservoir includes an internal volume, and wherein the accumulator occupies between about 40% and about 70% of the internal volume of the reservoir depending upon the amount of working fluid in the accumulator.

16. The expandable accumulator and reservoir assembly of claim 1, wherein the fracture strain of the innermost layer is between about 30% and about 70% greater than the fracture strain of the outermost layer.

17. The expandable accumulator and reservoir assembly of claim 1, wherein the stiffness of the outermost layer is between about 30% and about 70% greater than the stiffness of the innermost layer.

18. The expandable accumulator and reservoir assembly of claim 1, wherein up to about 75% of the working fluid in the reservoir can be exchanged with the accumulator.

19. The expandable accumulator and reservoir assembly of claim 1, wherein each of the innermost layer and the outermost layer is non-fibrous.

20. The expandable accumulator and reservoir assembly of claim 1, wherein the innermost layer includes a first thickness and the outermost layer includes a second thickness, and wherein the first thickness is reduced by at least about 40% when the accumulator is filled with working fluid at a pressure of at least about 5,000 psi.

21. The expandable accumulator and reservoir assembly of claim 1, wherein the innermost layer includes a first thickness and the outermost layer includes a second thickness, and wherein the second thickness is reduced by at least about 20% when the accumulator is filled with working fluid at a pressure of at least about 5,000 psi.

22. The expandable accumulator and reservoir assembly of claim 21, wherein the first thickness is reduced by at least about 40% when the accumulator is filled with working fluid at a pressure of at least about 5,000 psi.

23. The expandable accumulator and reservoir assembly of claim 1, wherein the innermost layer includes a first uncompressed thickness and the outermost layer includes a second uncompressed thickness, wherein the first and second uncompressed thicknesses are reduced by a total amount when the accumulator is filled with working fluid at a pressure of at least about 5,000 psi, and wherein up to about 85% of the total amount of reduced thickness occurs in the innermost layer.

24. The expandable accumulator and reservoir assembly of claim 1, wherein the innermost layer includes a first uncompressed thickness and the outermost layer includes a second uncompressed thickness, wherein the first and second uncompressed thicknesses are reduced by a total amount when the accumulator is filled with working fluid at a pressure of at least about 5,000 psi, and wherein up to about 15% of the total amount of reduced thickness occurs in the outermost layer.

25. The expandable accumulator and reservoir assembly of claim 1, wherein the accumulator includes a variable internal volume, and wherein the variable internal volume is configured to be increased up to about 13 times an initial internal volume corresponding with an unexpanded state of the accumulator.

26. The expandable accumulator and reservoir assembly of claim 1, wherein an inner surface of the outermost layer abuts and conforms to an outer surface of the innermost layer along substantially an entire length of the accumulator.

* * * * *